(12) United States Patent
Micic et al.

(10) Patent No.: US 10,877,884 B2
(45) Date of Patent: Dec. 29, 2020

(54) COPYING AND FORWARDING FOR CONCURRENT COPYING GARBAGE COLLECTION

(71) Applicant: International Business Machines Corporation, Armonk, NY (US)

(72) Inventors: Aleksandar Micic, Ottawa (CA); Joran S. C. Siu, Markham (CA); Irwin D'Souza, Toronto (CA); Filip Jeremic, Hamilton (CA); Charles R. Gracie, Ottawa (CA); Dmitri Pivkine, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 15/865,789

(22) Filed: Jan. 9, 2018

(65) Prior Publication Data

US 2019/0213125 A1    Jul. 11, 2019

(51) Int. Cl.
*G06F 12/02* (2006.01)

(52) U.S. Cl.
CPC ...... *G06F 12/0269* (2013.01); *G06F 12/0261* (2013.01); *G06F 2212/1016* (2013.01)

(58) Field of Classification Search
CPC ............. G06F 12/0269; G06F 12/0261; G06F 2212/1016
See application file for complete search history.

(56) References Cited

U.S. PATENT DOCUMENTS

| | | | |
|---|---|---|---|
| 7,653,793 B1 | 1/2010 | Garthwaite | |
| 7,716,192 B2 | 5/2010 | Petrank et al. | |
| 8,065,349 B2 | 11/2011 | Wright et al. | |
| 9,110,791 B2 | 8/2015 | Pizlo et al. | |
| 9,208,081 B1 | 12/2015 | Dice et al. | |
| 2008/0281886 A1 | 11/2008 | Petrank et al. | |

(Continued)

FOREIGN PATENT DOCUMENTS

| | | |
|---|---|---|
| EP | 2315126 A1 | 4/2011 |
| WO | 2010018613 A1 | 1/2012 |
| WO | 2019/138276 A1 | 7/2019 |

OTHER PUBLICATIONS

PCT International Search Report and Written Opinion, International Application No. PCT/IB2018/059041, dated Mar. 27, 2019, 9 pages.

*Primary Examiner* — Shew Fen Lin
(74) *Attorney, Agent, or Firm* — William H. Hartwell; Hunter E. Webb; Keohane & D'Alessandro, PLLC (57) ABSTRACT

An approach for optimizing a copying of a data object in a concurrent copying garbage collection operation is provided. In an embodiment, a source copy of the data object to be copied as part of the garbage collection operation is identified. A copying of the source copy to a target location is initiated by a primary accessing thread. This initiating of the copying includes the creation of a temporary target object header for the target object in the target location that contains an indicator set to indicate that the copying is ongoing. As the copying is occurring, the execution of any other accessing threads that are attempting to use the data object are held for as long as the indicator indicates that the copying is ongoing. Once the copying has completed, the target object header is replaced with a copy of the source object header, resetting the indicator.

17 Claims, 7 Drawing Sheets

(56) References Cited

U.S. PATENT DOCUMENTS

| | | | |
|---|---|---|---|
| 2009/0327374 A1* | 12/2009 | Wright | G06F 12/0269 |
| 2011/0113075 A1 | 5/2011 | Fukushima | |
| 2011/0264712 A1* | 10/2011 | Ylonen | G06F 12/0261 |
| | | | 707/818 |
| 2012/0239901 A1* | 9/2012 | Burka | G06F 12/0269 |
| | | | 711/171 |
| 2016/0364177 A1 | 12/2016 | Anderson | |

* cited by examiner

COPYING AND FORWARDING FOR CONCURRENT COPYING GARBAGE COLLECTION

TECHNICAL FIELD

In general, embodiments of the present invention relate to computer memory management. Specifically, embodiments of the present invention relate to an approach for optimizing the copying of a data object in a concurrent copying garbage collection operation.

BACKGROUND

In the modern computer processing environment, efficient management of computer system memory, whether physical or virtualized, is increasingly important. The contents of memory often change constantly as new data objects are created, used, and discarded by application threads running on the computer system. However, occasionally an object used by an application thread is not discarded in total after it has been used, resulting in memory that remains reserved for an object that is never used. Over time, this can lead to a memory that is filled with an increasingly greater number of unused data objects, leaving less memory space available for new data objects and decreasing the efficiency of application thread processing.

In order to solve this problem, most computer systems employ an operation known as garbage collection (GC). The GC operation analyzes memory or a section thereof and removes unused data objects. GC can use one of several different strategies to accomplish this. For example, in one strategy, named mark and sweep, active data objects in the area of memory on which GC is to be done are "marked" as active and any data objects that remain unmarked are deleted (swept) from memory.

An alternative strategy for performing GC is called copying collector GC. In copying collector-type GC, the area of memory on which GC is to be done is evacuated of all live objects. In some implementations, at the moment a live object is identified in the evacuate area the data object is copied to a new location, called a survivor space. This copying can be done in one of several ways. In Stop-The-World copying, the first thread to access the data object after the GC operation has begun allocates space for the data object in the survivor space and performs the copying of the data object while all other application threads wait until the copying has completed. Alternatively, in a concurrent copying GC implementation, every GC or application thread that attempts to access the data object after the GC operation has begun attempts to allocate space for the data object in the survivor space to copy the data object in its own pre-allocated space. In any case, after the data object has been copied, the address used by application threads to access the data object is updated to refer to the new location in the survivor space. The evacuated area, which is now free of live objects at the end of the cycle, can then be reused in its entirety.

SUMMARY

In general, an approach for optimizing a copying of a data object in a concurrent copying garbage collection operation is provided. In an embodiment, a source copy of the data object to be copied as part of the garbage collection operation is identified. A copying of the source copy to a target location is initiated by a primary accessing thread. This initiating of the copying includes the creation of a temporary target object header for the target object in the target location that contains an indicator set to indicate that the copying is ongoing. As the copying is occurring, the execution of any other accessing threads that are attempting to use the data object are held for as long as the indicator indicates that the copying is ongoing. Once the copying has completed, the target object header is replaced with a copy of the source object header, which resets the indicator and allows accessing threads to resume execution.

One aspect of the present invention includes a method for optimizing a copying of a data object in a concurrent copying garbage collection operation. The method comprises identifying a source copy of the data object to be copied as part of the garbage collection operation. The method further comprises initiating, by a primary accessing thread, a copying of the source copy to a target location, the initiating including creating a target object header for a target object in the target location that contains an indicator set to indicate that the copying is ongoing. The method further comprises holding an execution of a secondary accessing thread attempting to use the data object for as long as the indicator indicates that the copying is ongoing. The method further comprises replacing, in response to a completion of the copying, the target object header with a copy of a source object header of the source copy.

The method can optionally further comprise allocating, by an accessing thread in response to the identifying of the source copy, space for the data object in a survivor space. This method further comprises storing the target object header having the indicator in the allocated space. This method further comprises storing, in an atomic operation, a forwarding bit and a location of the allocated space as the target location the source object header in response to the setting of the forwarding bit. This method further comprises designating, as a result of the atomic storing operation being successful, the accessing thread as the primary accessing thread. This method further comprises for forwarding the secondary accessing thread to the target location in response to the secondary accessing thread determining that the forwarding bit is set in the source object header rewarding the secondary accessing thread to the target location in response to the secondary accessing thread determining that the forwarding bit is set in the source object header. This method offers several advantages, including, but not limited to, indicating to other accessing threads that the data object is being forwarded and the location that it is being forwarded to.

The method can optionally further comprise embodiments in which the indicator is a copying bit in the target object header that has a location that corresponds to a location of the forwarding bit in the source object header, and wherein the setting further includes setting the copying bit. This method offers several advantages, such as, but not limited to, a single bit indicator that is stored in a standardized location.

The method can optionally further comprise synchronizing the copying among a plurality of participating threads that includes both the primary accessing thread and the secondary accessing thread having the execution held. This method further comprises initializing, by the primary accessing thread, an uncopied data value in the target object header to a total size of the data object. This method further comprises incrementing, in response to any secondary accessing thread of the plurality of participating threads beginning to copy, a copying threads data value in the target object header. This method further comprises decrementing, in response to any participating thread starting the copying of a section of the data object, the uncopied value by a size of the section of the data. This method further comprises decrementing, in response to a determination by any secondary accessing thread that the uncopied value has reached 0, the copying threads data value, wherein the replacing of the target object header is performed by the primary accessing thread in response to a determination that the copying threads data value has been decremented to an initial value. This method offers several advantages, such as, but not limited to, synchronized copying performed by a plurality of accessing threads, reducing hold time.

The method can optionally further comprise embodiments in which the replacing of the target object header is performed in a single memory update and includes resetting the indicator and restoring a class information. This method offers several advantages, such as, but not limited to, the ability of the primary accessing thread to perform a single operation to restore access to the data object.

The method can optionally further comprise embodiments in which each of the primary accessing thread and the secondary accessing thread is one of a garbage collection thread or an application thread. This method offers several advantages, such as, but not limited to, the ability of either application threads or garbage collection threads to perform the copying.

The method can optionally further comprise embodiments in which the identifying further comprises reading, from a live object in memory, an object reference that references the source copy by at least one of: a garbage collection thread performing a scan of live objects in the memory or an application thread encountering the live object during a normal execution. This method offers several advantages, such as, but not limited to, identifying data objects for copying.

Another aspect of the present invention provides a system for optimizing a copying of a data object in a concurrent copying garbage collection operation, comprising: a memory medium comprising instructions; a bus coupled to the memory medium; and a processor coupled to the bus that when executing the instructions causes the system to: identify a source copy of the data object to be copied as part of the garbage collection operation; initiate, by a primary accessing thread, a copying of the source copy to a target location, the initiating including creating a target object header for a target object in the target location that contains an indicator set to indicate that the copying is ongoing; hold an execution of a secondary accessing thread attempting to use the data object for as long as the indicator indicates that the copying is ongoing; and; replace, in response to a completion of the copying, the target object header with a copy of a source object header of the source copy.

Yet another aspect of the present invention provides a computer program product for optimizing a copying of a data object in a concurrent copying garbage collection operation, the computer program product comprising a computer readable storage media, and program instructions stored on the computer readable storage media, that cause at least one computer device to: identify a source copy of the data object to be copied as part of the garbage collection operation; initiate, by a primary accessing thread, a copying of the source copy to a target location, the initiating including creating a target object header for a target object in the target location that contains an indicator set to indicate that the copying is ongoing; hold an execution of a secondary accessing thread attempting to use the data object for as long as the indicator indicates that the copying is ongoing; and replace, in response to a completion of the copying, the target object header with a copy of a source object header of the source copy.

Still yet another aspect of the present invention provides a method for deploying a system for optimizing a copying of a data object in a concurrent copying garbage collection operation, comprising: providing a computer infrastructure having at least one computer device that operates to: identify a source copy of the data object to be copied as part of the garbage collection operation; initiate, by a primary accessing thread, a copying of the source copy to a target location, the initiating including creating a target object header for a target object in the target location that contains an indicator set to indicate that the copying is ongoing; hold an execution of a secondary accessing thread attempting to use the data object for as long as the indicator indicates that the copying is ongoing; and replace, in response to a completion of the copying, the target object header with a copy of a source object header of the source copy.

BRIEF DESCRIPTION OF THE DRAWINGS

These and other features of this invention will be more readily understood from the following detailed description of the various aspects of the invention taken in conjunction with the accompanying drawings.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for optimizing a copying of a data object in a concurrent copying garbage collection operation. In an embodiment, a source copy of the data object to be copied as part of the garbage collection operation is identified. A copying of the source copy to a target location is initiated by a primary accessing thread. This initiating of the copying includes the creation of a temporary target object header for the target object in the target location that contains an indicator set to indicate that the copying is ongoing. As the copying is occurring, the execution of any other accessing threads that are attempting to use the data object are held for as long as the indicator indicates that the copying is ongoing. Once the copying has completed, the target object header is replaced with a copy of the source object header, which resets the indicator and allows accessing threads to resume execution.

Figure 1:
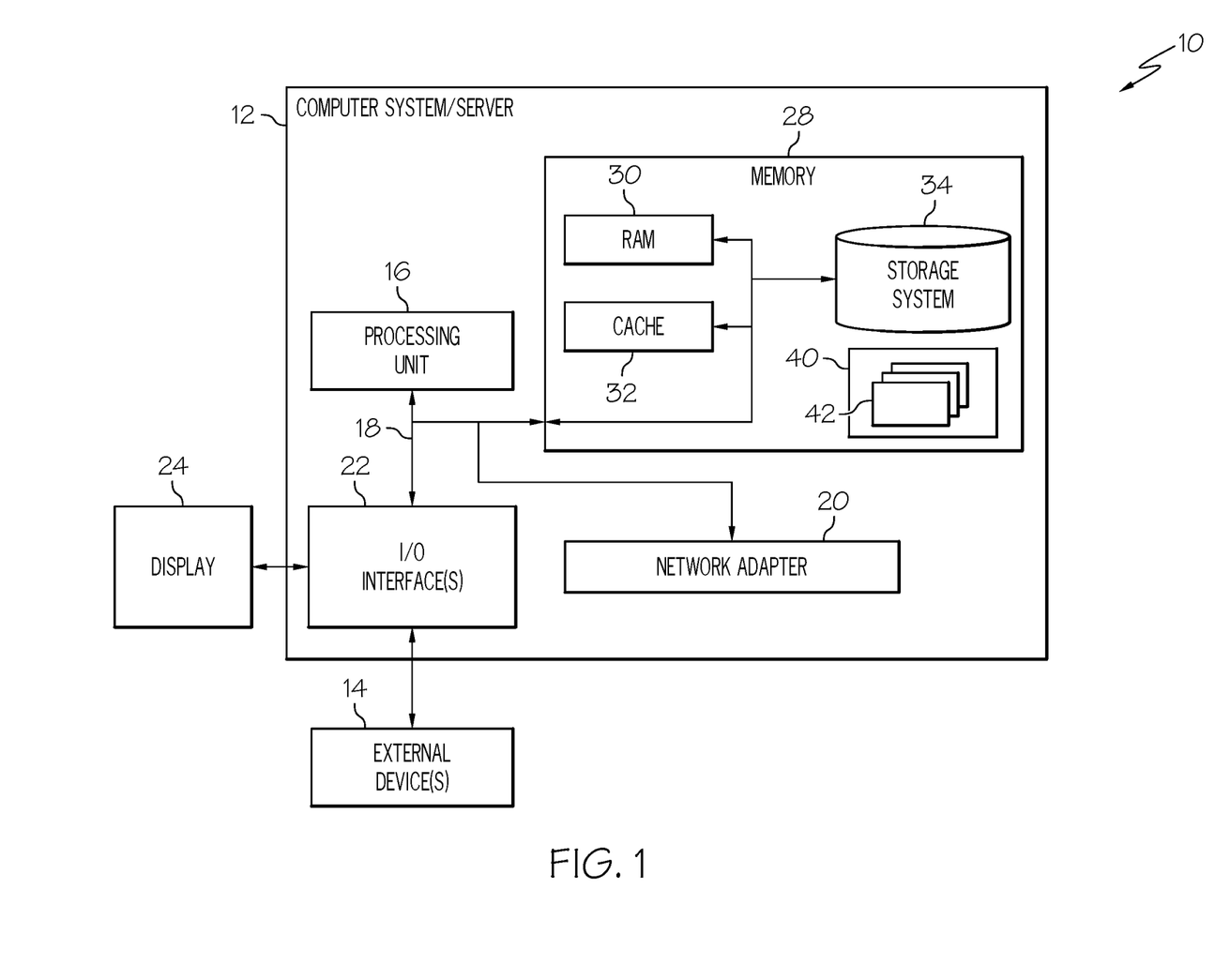
FIG. 1 depicts a computing environment according to an embodiment of the present invention.

Referring now to FIG. 1, a schematic of an example of a computing environment 10 is shown. Computing environment 10 is only one example of a suitable computing environment and is not intended to suggest any limitation as to the scope of use or functionality of embodiments of the invention described herein. Regardless, computing environment 10 is capable of being implemented and/or performing any of the functionality set forth hereinabove.

In computing environment 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in computing environment 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
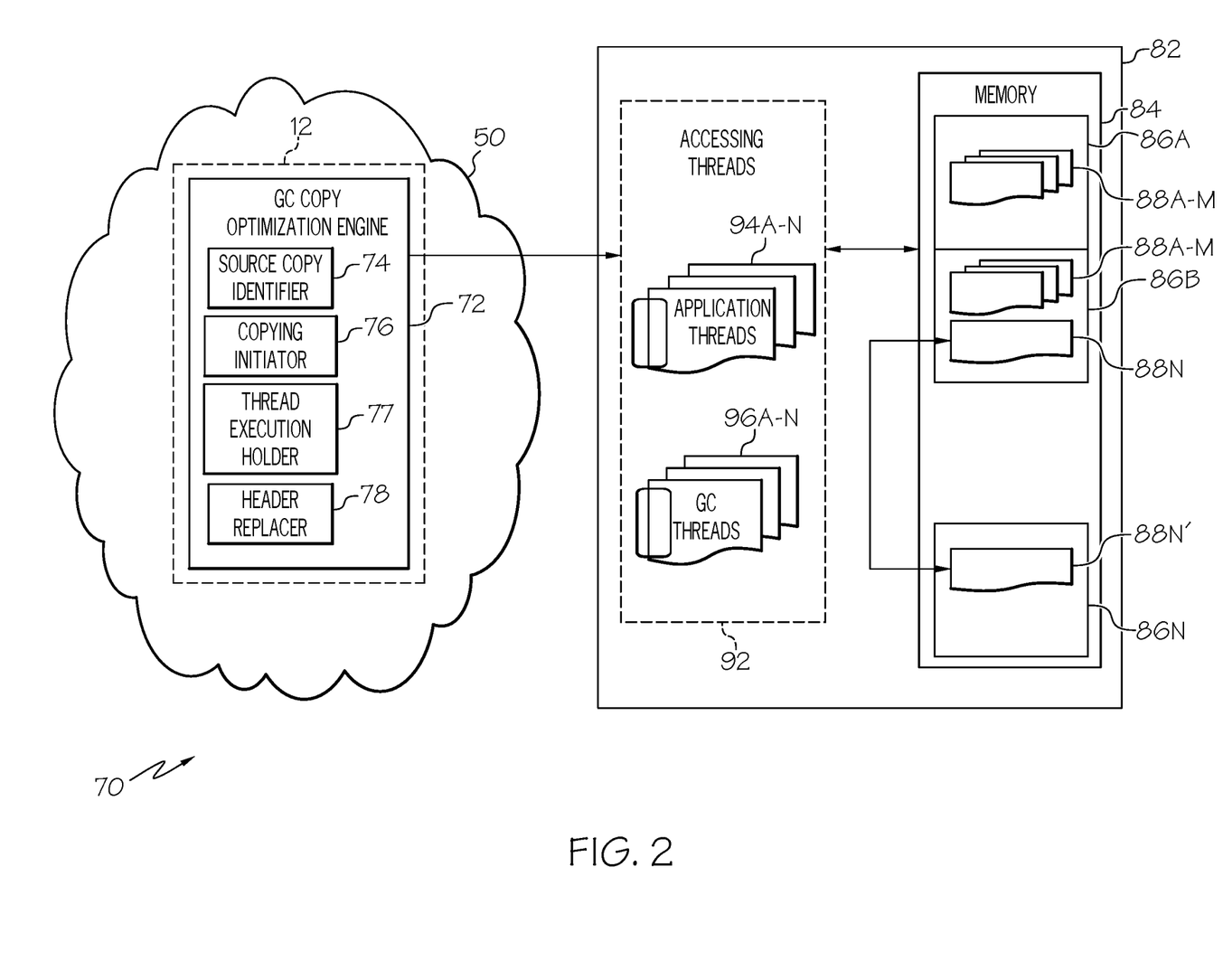
FIG. 2 depicts a system diagram according to an embodiment of the present invention.

Referring now to FIG. 2, a system diagram describing the functionality discussed herein according to an embodiment of the present invention is shown. It is understood that the teachings recited herein may be practiced within any type of computing environment 70, including, but not limited to, a single computer device, a client/server environment, a network computing environment (e.g., a cloud computing environment 50), and/or the like. A stand-alone computer system/server 12 is shown in FIG. 2 for illustrative purposes only. In the event the teachings recited herein are practiced in a networked computing environment, each client need not have a GC copy optimization engine (hereinafter "system 72"). Rather, system 72 could be loaded on a server or server-capable device that communicates (e.g., wirelessly) with the clients to provide optimized GC therefor. Regardless, as depicted, system 72 is shown within computer system/server 12. In general, system 72 can be implemented as program/utility 40 on computer system 12 of FIG. 1 and can enable the functions recited herein. It is further understood that system 72 may be incorporated within or work in conjunction with any type of system that receives, processes, and/or executes commands with respect to IT resources in a networked computing environment. Such other system(s) have not been shown in FIG. 2 for brevity purposes.

Along these lines, system 72 may perform multiple functions similar to a general-purpose computer. Specifically, among other functions, system 72 can optimize a copying of a data object in a concurrent copying garbage collection operation. To accomplish this, system 72 can include: a source copy identifier 74, a copying initiator 76, a thread execution holder 77, and a header replacer 78.

Source copy identifier 74 of system 72, as executed by computer system/server 12, is configured to identify a source copy 88N of a data object to be copied as part of the garbage collection (GC) operation. As stated above, a GC operation identifies active data objects 88A-N and removes unused data objects from a memory 84 of a computer system 82. To this extent, the teachings of this invention can be practiced in any environment in which GC is performed. In an embodiment, the GC operation can be performed in a managed run-time environment (e.g., Java, Python, Ruby, C #, Swift and/or the like) (Java is a trademark of Sun Microsystems; Python is a trademark of Python USA, Inc.; C # is a trademark of Microsoft, Inc.; and Swift is a trademark of Apple Inc., in the United States and/or elsewhere). In such an embodiment, memory 84 can be a heap used to store data objects 88A-N in the managed run-time environment.

In any case, as illustrated, memory 84 is partitioned into a number of memory partitions 86A-N. Periodically, a determination may be made that GC should be performed on a particular memory partition 86A-N. Assume for the sake of example, that it is determined that GC is to be performed on memory partition 86B. In a copying collector-type GC environment, source copy identifier 74 identifies that data object 88N is an active object within memory partition 86B (e.g., evacuate/source area) and, as such, needs to be copied to a survivor space 86N. In an embodiment, data object 88N is identified when an accessing thread 92 reads an object address field from any live data object 88A-N (e.g., data object 88A-N) in memory 82 when the value of the object address field refers to a data object 88A-N that is in the evacuate/source area 86B in memory 82 (e.g., heap) This identifying can be performed by either a dedicated GC thread 96A-N performing a scan, which can be recursive, of live objects in memory 82 (e.g., as part of the GC operation). The identifying can also or alternatively be performed by a regular application thread 94A-N that encounters the live object during the course of its normal execution. In any case, once identified, the copying of data object 88N to survivor space 88N can begin.

The inventors of the invention described herein have discovered certain deficiencies in the current solutions for copying of a data object 88N in a concurrent copying GC operation. For example, in Stop-the-World style GC, there is no issue with an accessing thread 92 using target data object 88N' until after the copying has completed (target data object 88N' is eventually subject to scanning, possibly by another GC thread 96N or the CPU, but it will not be pushed on the scanning queue and will not be available for scanning before copying is complete). However, application threads 94A-N in Stop-the-World style GC that are attempting to access data objects 88A-N during a GC operation may be subjected to hold times that may be longer than necessary while waiting for the GC operation to conclude the copying. In contrast, in a concurrent GC operation, application threads 94A-N run along with active GC threads 96A-N. As such, it is possible that an accessing thread 92 attempting to access a data object 88N could immediately follow the forwarding pointer to target data object 88N' and try to access the content of the target data object 88N' while the target data object 88N' is still in the process of being copied.

In one current solution to this problem in concurrent GC operations, each accessing thread 92 (whether application thread 94A-N or GC thread 96A-N) that attempts to access a data object 88N in the memory partition 86B undergoing GC will race to copy the data object 88N. That is, each accessing thread 92 will begin to allocate its own space in the survivor space 86N and to copy the data object 88N into its pre-allocated space. Then, after its copying has completed, each accessing thread 92 will attempt to have its copy of data object 88N designated as the new target data object 88N' in an atomic operation. However, this current solution can lead to the creation of a number of duplicate copies, only one of which ultimately becomes target data object 88N'. This introduces a number of inefficiencies. For example, the CPU time used by any 'losing' accessing thread 92 that made a copy of data object 88N that was not ultimately used as target data object 88N' and any space (e.g., heap space) allocated in survivor space 86N by the losing accessing thread 92 is wasted. Further, the CPU cache of a losing accessing thread 92 may end up being polluted with useless data as a result of the copying.

These deficiencies become even more pronounced if the data object 88N being copied is a relatively large one. For example, if data object 88N is too large for the CPU cache, the copying operations of any losing accessing thread 92 may occupy the shared data bus, potentially slowing down communications for other threads. Further, as the size (e.g., MBs in size) and popularity (e.g., being referenced by multiple other objects in the heap) of data object 88N increases, the probability of creating duplicates will significantly increase. Such an increase of copies of such a large object can have very noticeable negative side effects on system performance. This can be especially true with respect to the wasted space used to generate multiple large copies, since one slow thread/CPU might actually be unable to copy the object at all (due to survivor space 86N being totally consumed by multiple copies of this object by faster threads), so that the whole GC cycle has to be aborted. Such an aborted cycle can require a quite costly recovery operation, potentially causing very long delays, which completely defeats any benefits resulting from the concurrent GC operation.

Features of the current invention cure some or all of these deficiencies, among potentially others, by optimizing the copying of a data object in a concurrent copying GC operation. These features maintain the advantages of concurrent copying GC, while eliminating the creating of copying of multiple copies. This increases the efficiency with which GC operations can be performed. In some embodiments, these features enable the current invention to utilize multiple accessing threads 92 concurrently to perform a synchronized copying operation, further increasing computer operation efficiency during a GC operation.

Figure 3A:
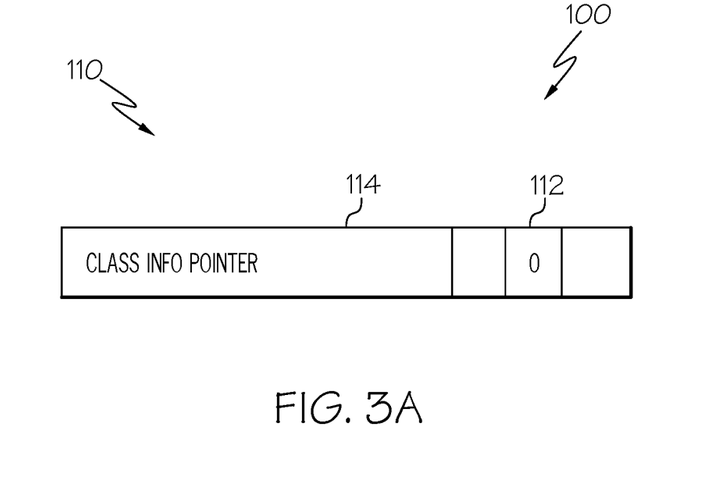
FIG. 3A depicts an example data object header according to an embodiment of the present invention.
Figure 3B:
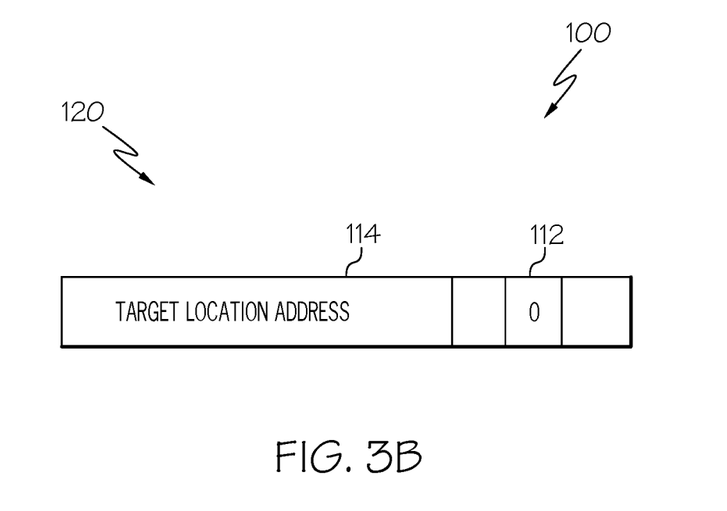
FIG. 3B depicts an example updated source copy header according to an embodiment of the present invention.

Referring now to FIGS. 3A-B, examples of source copy headers 100 are shown according to embodiments of the present invention. As shown in FIG. 3A, a data object header 110 represents an example original unmodified header for a data object 88A-N (FIG. 2) in memory 84 that has not yet been identified for copying as part of the GC operation. To this extent, forwarding bit 112 of data object header 110 is set to 0, indicating that it is not being copied. Further, class information pointer 114 in data object header 110 is set to point to class information about data object 88A-N (FIG. 2).

Once source copy 88N has been identified as a candidate for copying, similar to current non-concurrent GC solutions, any accessing applications 92 attempting to access source copy 88N will "race" to forward (allocate space for target data object 88N' in survivor space 86N) and to update object header 100 in an atomic operation. The first assessing thread to do so is often referred to as the "winning" thread and is referred to herein as the primary accessing thread (hereafter 92A). In any case, FIG. 3B shows an updated object header 120 resulting from the atomic updating of the header of source copy 88N by primary accessing thread 92A. As shown, forwarding bit 112 has been updated to 1, indicating that data object 88N is being forwarded to a new target location, and the address of this new target location has been stored in class location address 114 instead of the previous pointer to the class information. As can be seen, source copy 88N needs just one bit to signify the object is being forwarded to a remote location. In this implementation, forwarding address is shared with class/type pointer slot of the object. The forwarding bit is also typically part of this address word, since lower 2-4 bits of forwarding address are unused, due to object alignment (4-16 bytes respectively) and class/type information (if occupying the same slot). Also, due to enforced alignment several low position bits may not have to be used.

Referring additionally to FIG. 2, copying initiator 76 of system 72, as executed by computer system/server 12, is configured to initiate, by a primary accessing thread 92A, a copying of source copy 88N of identified data to a target location. Specifically, as part of the race to be designated as the primary accessing thread 92A, the thread can initiate the copying process. In order to perform this initiating, primary accessing thread 92A first creates a temporary target object header and copies the target object header to the target location to which target data object 88N' is being copied. This header includes an indicator that is set to indicate that the copying is ongoing. In an embodiment, the indicator is a bit that is located in target object header and that occupies the same location in target object header that the forwarding bit occupies in the source object header 120. To this extent, the present invention does not require any extra bit in the target location field (or anywhere in the original object). Rather, the (dual) shape of source data object 88N is not changed in any way, but is only altered in the same manner that the source object header 120 of any source data object 88N in a copying GC solution would be altered. The new state of 'still being copied' is maintained by an unused flag in the target object header. Since forwarded bit 112 is normally not used in target data object 88N' (objects are not recursively forwarded within one GC cycle), this very same bit can be used to signify the new intermediate state, as it is used elsewhere.

Figure 4:
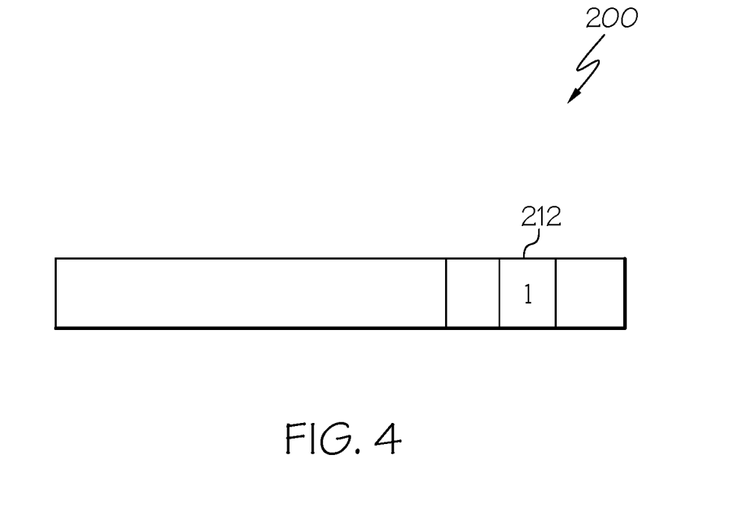
FIG. 4 depicts an example target header according to an embodiment of the present invention.

Referring now to FIG. 4, an example of a temporary target object header 200 is shown according to an embodiment of the invention. As shown, target object header 200 has been created with a copy bit 212 set to "1", indicating that the copying is ongoing. Further, in an embodiment, other portions (e.g., the portion corresponding to class info pointer/target location address 114) of the target object header 200 can also be used to facilitate copying, as will be described.

Referring again to FIG. 2 in conjunction with FIGS. 3B and 4, thread execution holder 77 of system 72, as executed by computer system/server 12, is configured to hold an execution of a secondary accessing thread attempting to use the data object for as long as the indicator indicates that the copying is ongoing. Specifically, once the target object header 200 with the copy indicator has been created by an accessing thread 92 and the accessing thread 92 has been designated as the primary accessing thread 92A, the primary accessing thread 92A can carry out the process of copying the data of source data copy 88N to target data object 88N'. During this time, any accessing thread 92, which is not the primary accessing thread 92A (hereafter secondary accessing thread 92N), that attempts to access source data copy 88N will check whether source object 88N is forwarded, by checking forwarding bit 112 in source object header 100. In response to a determination that forwarding bit 112 is set in source object header 100, the secondary accessing thread 92N will be forwarded to the target location (e.g., via the target location address stored in class information location 114). Upon arriving at the target location, the secondary accessing thread 92N will check whether copy bit 212 in target object header 200 is set. If copy bit 212 is set, the secondary accessing thread 92N will be held (e.g., will wait) for some period of time before checking copy bit 212 again. Thus, any accessing threads 92 are prohibited from accessing target data object 88N' and/or target object address while the copying is ongoing, as indicated by the indicator (e.g., copy bit 212). In most cases, waiting will involve active spinning for no more than a very short period of time since most of the objects being copied are relatively small, and will be available quickly. However, if target data object 88N' is still not available after a predetermined period of time, the accessing thread 92 may resort to some more spinning while yielding CPU and eventually sleeping and periodically awakening.

In an embodiment, thread execution holder 77 can use the losing (e.g., secondary) accessing threads 92N to perform a copying operation in which the copying of source copy 88N is synchronized among a plurality of (participating) accessing threads 92. This can be based on a determination that the data object to be copied is greater that a predetermined size. In any case, in such an operation both the "winning" primary accessing thread 92A and any "losing" secondary accessing threads 92N can be included in the copying operation. The number of secondary accessing threads 92N that are allowed to participate can be limited based on such factors as the size of the data object 88N, the amount of available bus space, and/or the like). In any case, in order to accomplish this, additional information used to facilitate the synchronized copying can be stored in other portions (e.g., the portion corresponding to class info pointer/target location address 114) of the target object header 200.

Figure 5:
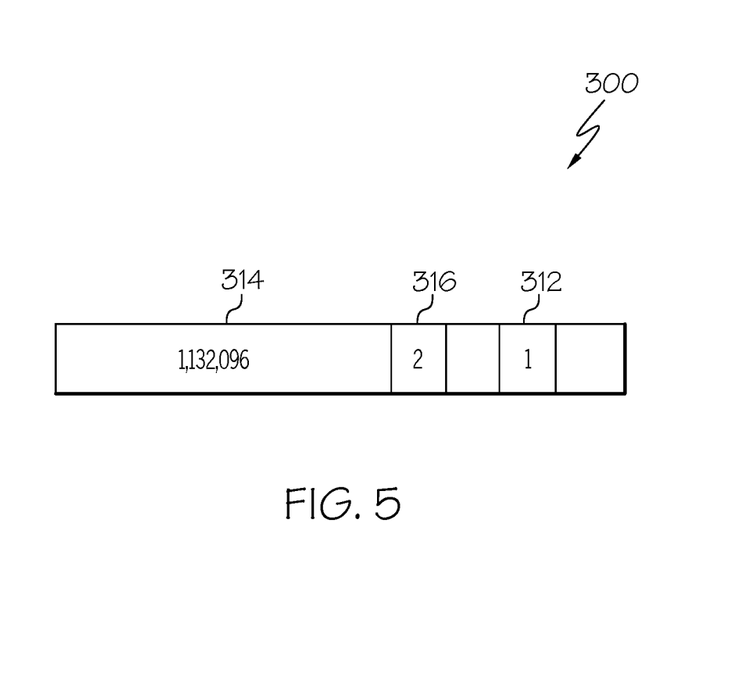
FIG. 5 depicts an example target header according to an embodiment of the present invention.

Referring now to FIG. 5, a temporary target object header 300 that has been adapted for synchronized copying utilizing a plurality of accessing threads 92 (FIG. 2) is illustrated according to an embodiment of the invention. As previously described, target object header 300 has an indicator in the form of a copy bit 312 that has been set. Further, as shown, an uncopied data value field 314, that holds the size of the target data object 88N' yet to be copied, is also set. Similarly, a participating threads field 316 that holds the number of accessing threads 92 that are participating in the synchronized copying has also been set.

Figure 6:
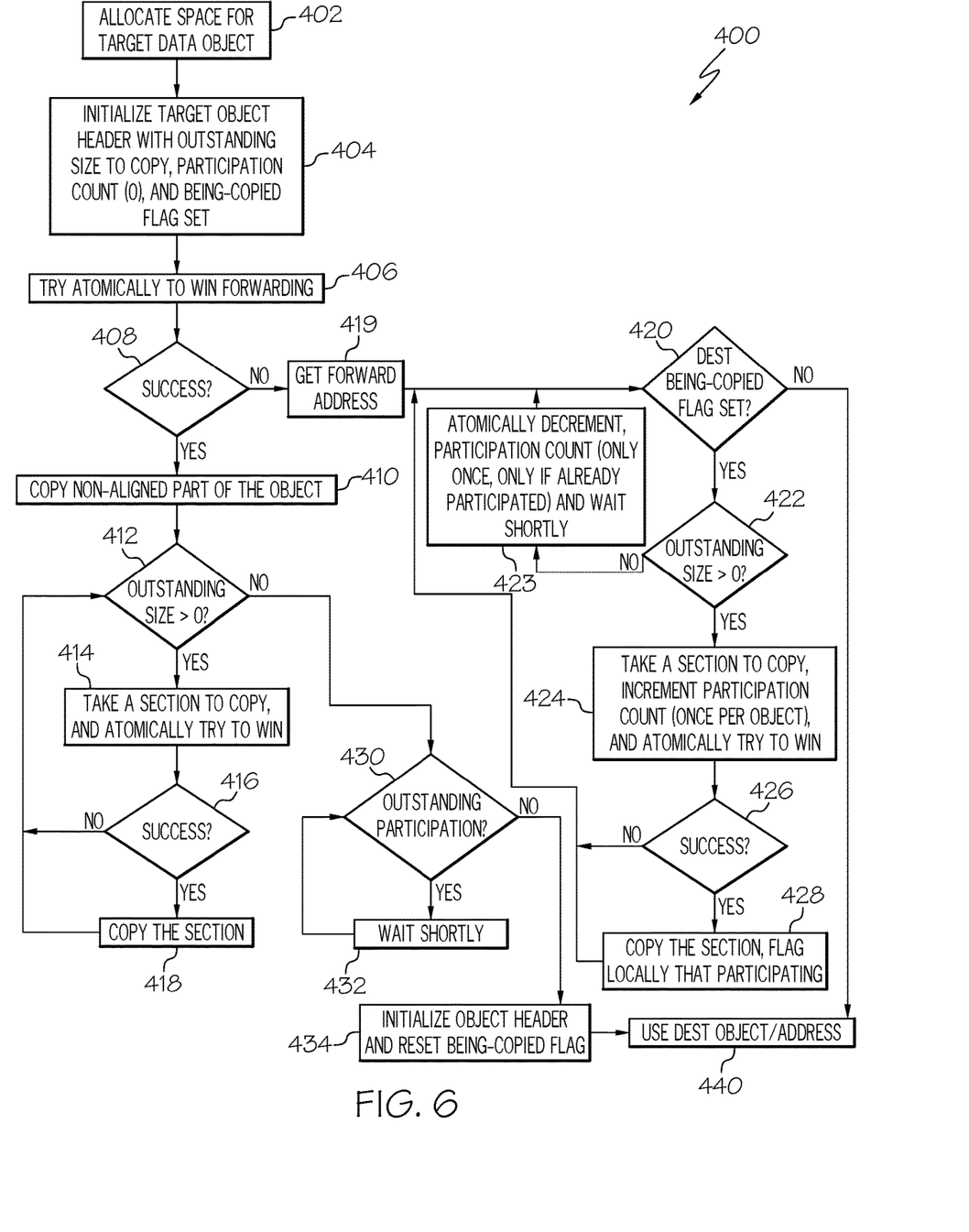
FIG. 6 depicts an example process flowchart according to an embodiment of the present invention.

Referring now to FIG. 6, a process flowchart 400 demonstrating synchronized copying using a plurality of participating threads is shown according to an embodiment of the invention. Flow begins with the processes described above in which any accessing thread 92 attempting to access data object 88N attempts to allocate space for target data object 88N' (FIG. 2) in 402. Referring additionally to FIGS. 2 and 5, the creation of target object header 250 includes initializing target object header 250 in 404 by setting uncopied data value field 314 to the total size of the data object 88N to be copied, setting the copying threads value field 316 to 0, and setting the copying bit to 1. At 406, the accessing thread 92 attempts to win the forwarding as described previously and become the primary accessing thread 92A.

In 408, once a thread succeeds in winning the forwarding and becomes the primary accessing thread 92A, the copying of source copy 88N to survivor space proceeds in fixed-length sections from end to beginning, with primary accessing thread 92A at 410 performing the copy of any unaligned data (e.g., data at the end of source copy 88N that does not constitute a full section in length). During the copying, each time primary accessing thread 92A has completed a copying operation, uncopied data value field 314 is checked in 412 to make sure that the uncopied data value is greater than 0 (e.g., there is more data left to be copied). In 414, if more data remains to be copied, primary accessing thread 92A selects a section to be copied and attempts to win it in an atomic operation. If the section is not successfully won in 416, flow process proceeds back to 412. Otherwise, primary accessing thread 92A decrements the uncopied value by the size of the section of data being copied and copies the won section at 418. This continues until the uncopied data value is 0 (e.g., there is no more data left to be copied), at which point primary accessing thread 92A waits in 432 until in 430 all other threads have completed their copies (e.g., until copying threads data value is 0).

For any accessing thread 92 that is a losing/secondary accessing thread 92N (e.g., does not succeed at 408 in winning the forwarding at 406 or attempts to access source copy 88N after the primary accessing thread 92A has been determined) the thread is forwarded at 419 using the forwarding address set by the primary accessing thread 92A where, at 420 secondary accessing thread 92N checks the indicator (e.g., whether copying bit 312 is set) to determine whether copying is ongoing. If so, similar to primary accessing thread 92A, secondary accessing thread 92N checks uncopied data value field 314 at 422 to make sure that the uncopied data value is greater than 0 (e.g., there is more data left to be copied). In 424, if more data remains to be copied, the secondary accessing thread selects a section to be copied and attempts to win it in an atomic operation, which also decrements the uncopied value by the size of the section of data being copied and, if this is the first section of data being copied by secondary thread, 92N, increments the copying threads data value in the copying threads value field 316. Secondary thread 92N then copies the won section at 428 after which process returns to 420. If the section is not successfully won in 426, process proceeds back to 420. This continues until the uncopied data value is 0 (e.g., there is no more data left to be copied), at which point at 423 secondary accessing thread decrements copying threads data value in copying threads value field 316 by 1 in an atomic operation and waits until the indicator indicates that the copying has completed (e.g., whether copying bit 212 is 0), at which time flow proceeds to 440.

Figure 7:
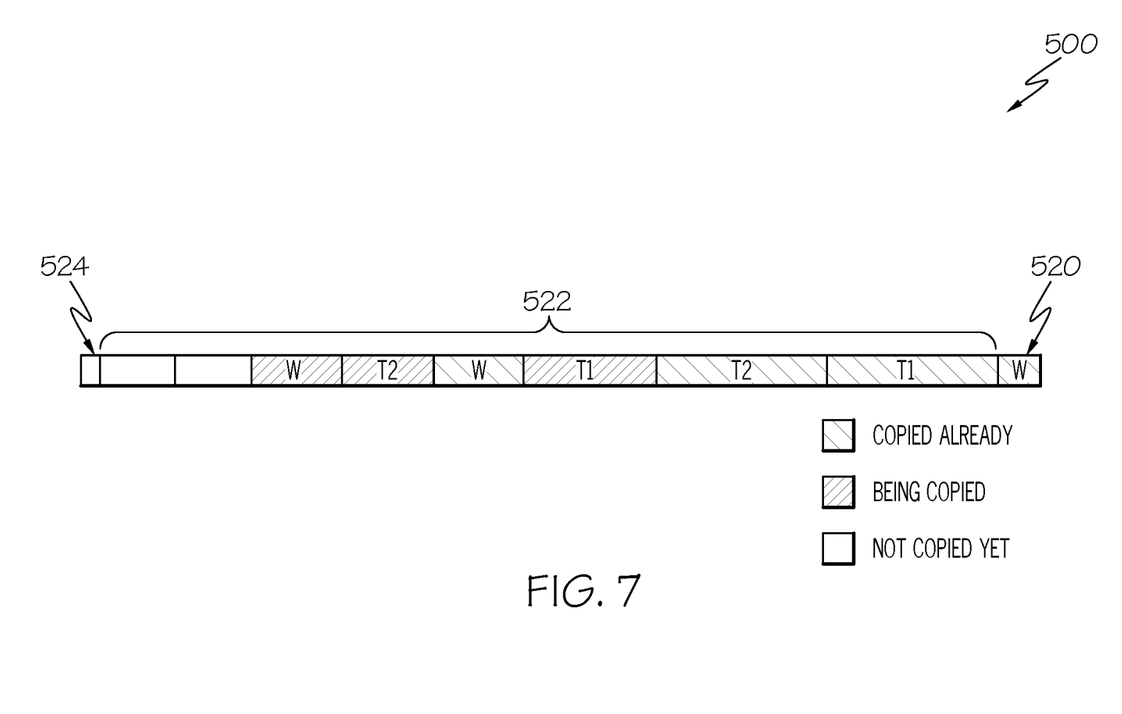
FIG. 7 depicts an example target data object according to an embodiment of the present invention.

Referring now to FIG. 7, an example of a target data object 500 during copying by a plurality of accessing threads (FIG. 2) is illustrated according to an embodiment of the present invention. Referring additionally to FIG. 2, as illustrated, the accessing threads 92 performing the synchronized copying include primary accessing thread W and secondary accessing threads T1 and T2. As such, copying threads data value=2 to reflect the fact the two secondary accessing threads 92N (in addition to primary accessing thread W) are participating in the copying. As shown, a non-aligned section 520 at the end of target data object 88N' has been copied by primary accessing thread W. Other sections 522 are in various stages of copying, with three sections having been copied already, three sections presently being copied, and two sections that have not been copied yet. As such, the uncopied data value is equal to the size of the two sections that have yet to be copied. Further, the final version of object header 524 also has yet to be copied as will be described.

Referring again to FIG. 2 in conjunction with FIGS. 3A and 4, thread execution holder 78 of system 72, as executed by computer system/server 12, is configured to replace target object header 300 with a copy of the original source object header 110 of the source copy in response to a completion of the copying. Specifically, referring additionally to FIG. 6, once all accessing threads 92 have completed copying, as indicated by both uncopied data value and copying threads data value being 0, primary accessing thread 92A completes the copying by restoring the target object header 300 to that of the pre-copied data object 88N as in 434, which also resets the indicator (e.g., resets the copying bit 212 to 0). In an embodiment, the replacing of the target object header is performed in a single memory update in which both the indicator is reset and the class information is restored as well as any other fields that may be in the target header such as, but not limited to object age, hash bits etc. This resetting of the indicator indicates to all accessing threads 92 that the target data object 88N' is available for use, ending the holding of the secondary accessing threads 92N. Then, addresses used by application threads 96A-N to access the data object can be reset to refer to the target location.

Figure 8:
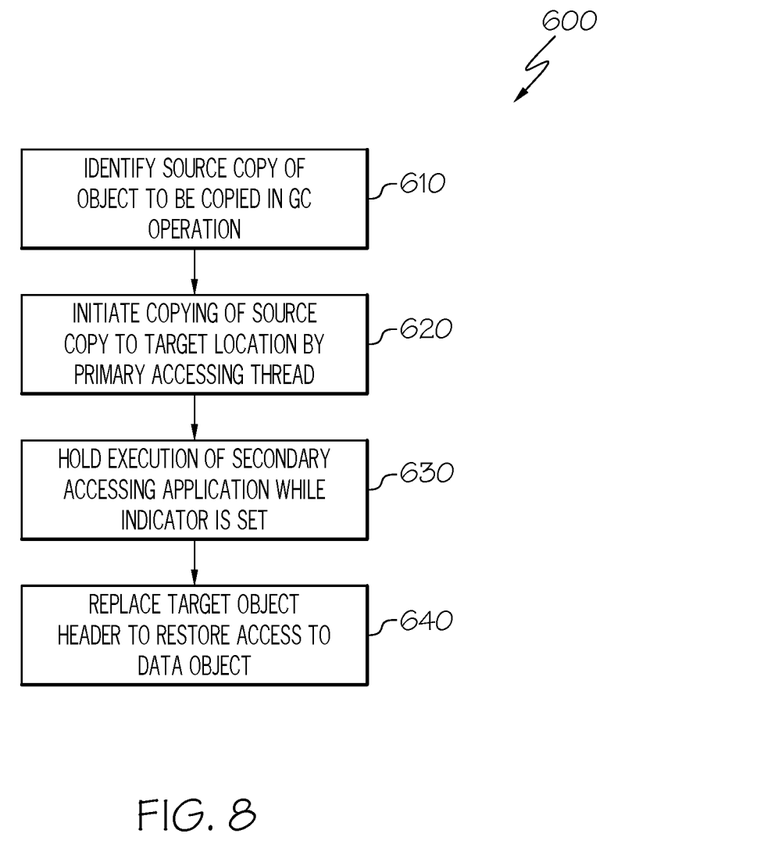
FIG. 8 depicts an example method flowchart according to an embodiment of the present invention.

Referring now to FIG. 8 in conjunction with FIG. 2, a method flowchart 600 according to an embodiment of the present invention is shown. At 610, source copy identifier 74 of system 72, as executed by computer system/server 12, identifies a source copy 88N of the data object to be copied as part of the garbage collection operation. At 620, copying initiator 76 of system 72, as executed by computer system/server 12, initiates a copying of source copy 88N to a target location. The initiating includes the primary accessing thread 92A creating a target object header for a target object in the target location that contains an indicator. This indicator is set to indicate that the copying is ongoing. At 630, thread execution holder 77, of system 72, as executed by computer system/server 12, holds the execution of any secondary accessing thread 92N attempting to use the data object for as long as the indication indicates the copying is ongoing, while optionally using the held threads in the copy process. At 640, header replacer 78 of system 72, as executed by computer system/server 12, replaces the target object header with a copy of the source object header of the source copy in response to the completion of the copying. This restoring restores access to the copied data object.

The flowchart of FIG. 8 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

While shown and described herein as an approach for optimizing a copying of a data object in a concurrent copying garbage collection operation, it is understood that the invention further provides various alternative embodiments. For example, in one embodiment, the invention provides a method that performs the process of the invention on a subscription, advertising, and/or fee basis. That is, a service provider, such as a Solution Integrator, could offer to provide functionality for optimizing a copying of a data object in a concurrent copying garbage collection operation. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In another embodiment, the invention provides a computer-implemented method for optimizing a copying of a data object in a concurrent copying garbage collection operation. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, system 72 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided approaches for optimizing a copying of a data object in a concurrent copying garbage collection operation. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for optimizing a copying of a data object in a concurrent copying garbage collection operation, the method comprising the computer-implemented processes of:
    identifying a source copy of the data object to be copied as part of the garbage collection operation;
    selecting a primary accessing thread from among a plurality of accessing threads that are competing in a race to allocate space for a single data object, which is the data object, in a survivor space, the primary accessing thread being selected as a result of being a first thread to allocate the space and to update a source object header of the data object in an atomic operation;
    initiating, by the primary accessing thread, a copying of the source copy to a target location, the initiating including creating a target object header for a target object in the target location, the target object header containing an indicator set to indicate that the copying is ongoing, such that other accessing threads are notified of a status of the copying by accessing the target object header, wherein the indicator is a copying bit in the target object header that has a location that corresponds to a location of the forwarding bit in the source object header, and wherein the setting further includes setting the copying bit;
    holding an execution of a secondary accessing thread attempting to use the data object for as long as the indicator indicates that the copying is ongoing; and
    replacing, in response to a completion of the copying, the target object header with a copy of the source object header of the source copy.

2. The method of claim 1, the selecting further comprising:
    allocating, by an accessing thread of the plurality of accessing threads in response to the identifying of the source copy, space for the data object in a survivor space;
    storing the target object header having the indicator in the allocated space;
    storing, in an atomic operation, a forwarding bit and a location of the allocated space as the target location the source object header in response to the setting of the forwarding bit;
    designating, as a result of the atomic storing operation being successful, the accessing thread as the primary accessing thread; and
    forwarding the secondary accessing thread to the target location in response to the secondary accessing thread determining that the forwarding bit is set in the source object header.

3. The method of claim 1, further comprising synchronizing the copying of a single data object among a plurality of participating threads that includes both the primary accessing thread and the secondary accessing thread having the execution held, the synchronizing including:
    initializing, by the primary accessing thread, an uncopied data value in the target object header to a total size of the data object;
    incrementing, in response to any secondary accessing thread of the plurality of participating threads beginning to copy, a copying threads data value in the target object header;
    decrementing, in response to any participating thread starting the copying of a section of the data object, the uncopied value by a size of the section of the data; and
    decrementing, in response to a determination by any secondary accessing thread that the uncopied value has reached 0, the copying threads data value,
    wherein the replacing of the target object header is performed by the primary accessing thread in response to a determination that the copying threads data value has been decremented to an initial value.

4. The method of claim 1, wherein the replacing of the target object header is performed in a single memory update and includes resetting the indicator and restoring a class information.

5. The method of claim 1, wherein each of the primary accessing thread and the secondary accessing thread is one of a garbage collection thread or an application thread.

6. The method of claim 1, wherein the identifying further comprises reading, from a live object in memory, an object reference that references the source copy by at least one of: a garbage collection thread performing a scan of live objects in the memory or an application thread encountering the live object during a normal execution.

7. A system for optimizing a copying of a data object in a concurrent copying garbage collection operation, comprising:
    a memory medium comprising instructions;
    a bus coupled to the memory medium; and
    a processor coupled to the bus that when executing the instructions causes the system to:
        identify a source copy of the data object to be copied as part of the garbage collection operation;
        select a primary accessing thread from among a plurality of accessing threads that are competing in a race to allocate space for a single data object, which is the data object, in a survivor space, the primary accessing thread being selected as a result of being a first thread to allocate the space and to update a source object header of the data object in an atomic operation;
        initiate, by the primary accessing thread, a copying of the source copy to a target location, the initiating including creating a target object header for a target object in the target location, the target object header containing an indicator set to indicate that the copying is ongoing, such that other accessing threads are notified of a status of the copying by accessing the target object header, wherein the indicator is a copying bit in the target object header that has a location that corresponds to a location of the forwarding bit in the source object header, and wherein the setting further includes setting the copying bit;

hold an execution of a secondary accessing thread attempting to use the data object for as long as the indicator indicates that the copying is ongoing; and replace, in response to a completion of the copying, the target object header with a copy of the source object header of the source copy.

8. The system of claim 7, the instructions to select further causing the system to:

allocate, by an accessing thread of the plurality of accessing threads in response to the identifying of the source copy, space for the data object in a survivor space;

store the target object header having the indicator in the allocated space;

store, in an atomic operation, a forwarding bit and a location of the allocated space as the target location the source object header in response to the setting of the forwarding bit;

designate, as a result of the atomic storing operation being successful, the accessing thread as the primary accessing thread; and forward the secondary accessing thread to the target location in response to the secondary accessing thread determining that the forwarding bit is set in the source object header.

9. The system of claim 7, the instructions further causing the system to synchronize the copying of a single data object among a plurality of participating threads that includes both the primary accessing thread and the secondary accessing thread having the execution held, which includes:

initializing, by the primary accessing thread, an uncopied data value in the target object header to a total size of the data object;

incrementing, in response to any secondary accessing thread of the plurality of participating threads beginning to copy, a copying threads data value in the target object header;

decrementing, in response to any participating thread starting the copying of a section of the data object, the uncopied value by a size of the section of the data; and decrementing, in response to a determination by any secondary accessing thread that the uncopied value has reached 0, the copying threads data value, wherein the replacing of the target object header is performed by the primary accessing thread in response to a determination that the copying threads data value has been decremented to an initial value.

10. The system of claim 7, wherein the instructions causing the system replace the target object header replaces that target object header in a single memory update and includes resetting the indicator and restoring a class information.

11. The system of claim 7, wherein each of the primary accessing thread and the secondary accessing thread is one of a garbage collection thread or an application thread.

12. The system of claim 7, wherein the instructions to identify further include reading, from a live object in memory, an object reference that references the source copy by at least one of: a garbage collection thread performing a scan of live objects in the memory or an application thread encountering the live object during a normal execution.

13. A computer program product for optimizing a copying of a data object in a concurrent copying garbage collection operation, the computer program product comprising a computer readable storage media, and program instructions stored on the computer readable storage media, that cause at least one computer device to:

identify a source copy of the data object to be copied as part of the garbage collection operation;

selecting a primary accessing thread from among a plurality of accessing threads that are competing in a race to allocate space for a single data object, which is the data object, in a survivor space, the primary accessing thread being selected as a result of being a first thread to allocate the space and to update a source object header of the data object in an atomic operation;

initiate, by the primary accessing thread, a copying of the source copy to a target location, the initiating including creating a target object header for a target object in the target location, the target object header containing an indicator set to indicate that the copying is ongoing, such that other accessing threads are notified of a status of the copying by accessing the target object header, wherein the indicator is a copying bit in the target object header that has a location that corresponds to a location of the forwarding bit in the source object header, and wherein the setting further includes setting the copying bit;

hold an execution of a secondary accessing thread attempting to use the data object for as long as the indicator indicates that the copying is ongoing; and replace, in response to a completion of the copying, the target object header with a copy of the source object header of the source copy.

14. The computer program product of claim 13, the instructions to select further causing the at least one computer device to:

allocate, by an accessing thread of the plurality of accessing threads in response to the identifying of the source copy, space for the data object in a survivor space;

store the target object header having the indicator in the allocated space;

store, in an atomic operation, a forwarding bit and a location of the allocated space as the target location the source object header in response to the setting of the forwarding bit;

designate, as a result of the atomic storing operation being successful, the accessing thread as the primary accessing thread; and forward the secondary accessing thread to the target location in response to the secondary accessing thread determining that the forwarding bit is set in the source object header.

15. The computer program product of claim 13, the instructions further causing the at least one computer device to synchronize the copying of a single data object among a plurality of participating threads that includes both the primary accessing thread and the secondary accessing thread having the execution held, which includes:

initializing, by the primary accessing thread, an uncopied data value in the target object header to a total size of the data object;

incrementing, in response to any secondary accessing thread of the plurality of participating threads beginning to copy, a copying threads data value in the target object header;

decrementing, in response to any participating thread starting the copying of a section of the data object, the uncopied value by a size of the section of the data; and decrementing, in response to a determination by any secondary accessing thread that the uncopied value has reached 0, the copying threads data value, wherein the replacing of the target object header is performed by the primary accessing thread in response to a determination that the copying threads data value has been decremented to an initial value.

16. The computer program product of claim 13, wherein the instructions causing the system replace the target object header replaces that target object header in a single memory update and includes resetting the indicator and restoring a class information.

17. The computer program product of claim 13, wherein the instructions to identify further include reading, from a live object in memory, an object reference that references the source copy by at least one of: a garbage collection thread performing a scan of live objects in the memory or an application thread encountering the live object during a normal execution.

* * * * *